United States Patent
Shimada et al.

(10) Patent No.: US 9,206,072 B2
(45) Date of Patent: *Dec. 8, 2015

(54) COLORED GLASS PLATE AND METHOD FOR ITS PRODUCTION

(71) Applicant: ASAHI GLASS COMPANY, LIMITED, Chiyoda-ku (JP)

(72) Inventors: Yuya Shimada, Tokyo (JP); Yuki Kondo, Tokyo (JP); Tomoyuki Kobayashi, Tokyo (JP)

(73) Assignee: Asahi Glass Company, Limited, Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/304,302

(22) Filed: Jun. 13, 2014

(65) Prior Publication Data

US 2014/0291593 A1 Oct. 2, 2014

Related U.S. Application Data

(63) Continuation of application No. PCT/JP2013/051658, filed on Jan. 25, 2013.

(30) Foreign Application Priority Data

Jan. 27, 2012 (JP) .................................. 2012-015561

(51) Int. Cl.
*C03C 3/087* (2006.01)
*C03C 4/02* (2006.01)
*C03C 4/08* (2006.01)

(52) U.S. Cl.
CPC . *C03C 3/087* (2013.01); *C03C 4/02* (2013.01); *C03C 4/085* (2013.01)

(58) Field of Classification Search
CPC .......... C03C 3/087; C03C 4/02; C03C 4/085; C03C 4/08
See application file for complete search history.

(56) References Cited

U.S. PATENT DOCUMENTS

| | | | |
|---|---|---|---|
| 5,385,872 A | 1/1995 | Gulotta et al. | |
| 5,723,390 A | 3/1998 | Kijima et al. | |
| 5,747,398 A | 5/1998 | Higby et al. | |
| 5,897,956 A | 4/1999 | Kijima et al. | |
| 5,908,702 A * | 6/1999 | Mita et al. | 428/426 |
| 5,994,249 A * | 11/1999 | Graber et al. | 501/71 |
| 6,071,840 A | 6/2000 | Sasage et al. | |
| 6,103,650 A * | 8/2000 | Krumwiede | 501/71 |
| 6,589,897 B1 | 7/2003 | Foguenne | |
| 8,518,843 B2 | 8/2013 | Shimada et al. | |
| 2002/0058579 A1* | 5/2002 | Seto et al. | 501/71 |
| 2003/0050175 A1* | 3/2003 | Seto et al. | 501/71 |
| 2007/0054796 A1* | 3/2007 | Shelestak et al. | 501/71 |
| 2007/0099788 A1* | 5/2007 | Shelestak et al. | 501/64 |
| 2013/0105722 A1* | 5/2013 | Tsuzuki et al. | 252/62 |
| 2013/0306900 A1 | 11/2013 | Shimada et al. | |
| 2015/0008378 A1* | 1/2015 | Shimada et al. | 252/586 |

FOREIGN PATENT DOCUMENTS

| | | |
|---|---|---|
| JP | 3190965 | 5/2001 |
| JP | 3256243 | 11/2001 |
| JP | 2002-160938 | 6/2002 |
| JP | 2002-529365 | 9/2002 |
| JP | 2003-508338 | 3/2003 |
| JP | 2006-518324 | 8/2006 |
| JP | 3900550 | 1/2007 |
| WO | WO 2011152257 A1 * | 12/2011 |

OTHER PUBLICATIONS

U.S. Appl. No. 14/444,362, filed Jul. 28, 2014, Shimada, et al.
U.S. Appl. No. 14/304,013, filed Jun. 13, 2014, Shimada, et al.
International Search Report issued Apr. 23, 2013 in PCT/JP2013/051658 filed Jan. 25, 2013.

* cited by examiner

*Primary Examiner* — Anthony J Green
*Assistant Examiner* — Elizabeth A Bolden
(74) *Attorney, Agent, or Firm* — Oblon, McClelland, Maier & Neustadt, L.L.P.

(57) ABSTRACT

To provide a colored glass plate which, despite containing substantially no expensive cerium, simultaneously satisfies low solar transmittance, high visible light transmittance and low UV transmittance, while transmitted light has a green color tone, The colored glass plate comprises, as represented by mass percentage based on oxides, $SiO_2$: from 65 to 75%, $Al_2O_3$: from 0 to 6%, MgO: at least 0% and less than 2%, CaO: from 5 to 15%, total iron calculated as $Fe_2O_3$: from 0.3 to 1.2%, total titanium calculated as $TiO_2$: from 0.2 to 1.1%, and total vanadium calculated as $V_2O_5$: from 0.02 to 0.3%, and contains substantially no cerium, cobalt, chromium or manganese.

14 Claims, 1 Drawing Sheet

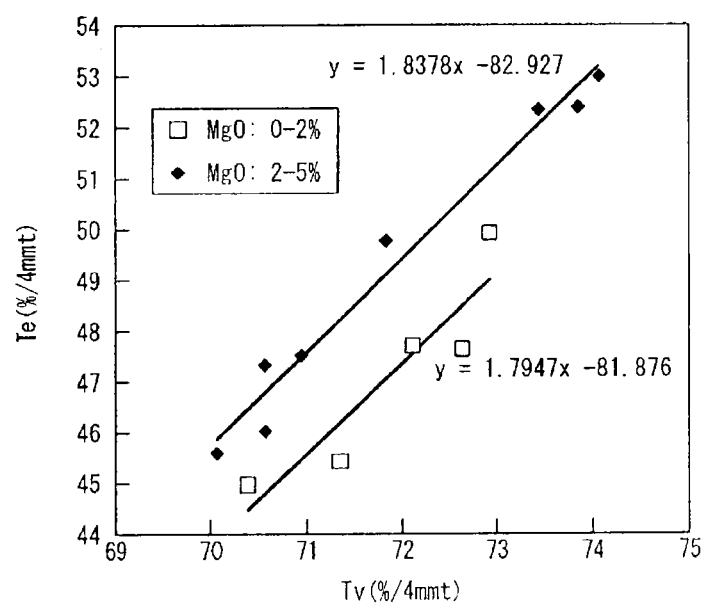

COLORED GLASS PLATE AND METHOD FOR ITS PRODUCTION

This application is a continuation of PCT Application No. PCT/JP2013/051658, filed on Jan. 25, 2013, which is based upon and claims the benefit of priority from Japanese Patent Application No. 2012-015561 filed on Jan. 27, 2012. The contents of those applications are incorporated herein by reference in their entireties.

TECHNICAL FIELD

The present invention relates to a colored glass plate which simultaneously satisfies low solar transmittance, high visible light transmittance and low UV transmittance, while transmitted light has a green color tone, and a method for its production.

BACKGROUND ART

As a glass plate for automobiles, a colored glass plate (e.g. a heat-absorbing glass plate or a UV-absorbing glass plate) is known, which contains a colorant component whereby transmitted light has a green or blue color tone.

For such a colored glass plate, the solar transmittance is required to be low (e.g. the value, as calculated in a thickness of 4 mm, of solar transmittance (hereinafter referred to also as Te) stipulated in JIS R3106 (1998) is required to be at most 55%). Further, the visible light transmittance is required to be high (e.g. the value, as calculated in a thickness of 4 mm, of visible light transmittance (illuminant A, 2 degrees field of vision) (hereinafter referred to also as Tv) stipulated in JIS R3106 (1998) is required to be at least 70%). Further, the UV-transmittance is required to be low (e.g. the value, as calculated in a thickness of 4 mm, of UV-transmittance (hereinafter referred to also as Tuv) stipulated in ISO-9050 is required to be at most 12%).

Further, as such a colored glass plate, a glass plate tends to be preferred such that when a passenger watches the scenery through the glass plate, the color tone of the transmitted light has a green color tone being a more natural color tone (e.g. the dominant wavelength (hereinafter referred to as also as Dw) of transmitted light stipulated in JIS Z8701 (1982) is from 540 to 570 nm).

Further, for such a colored glass plate, it is desired that types of colorant components be reduced as far as possible and that unit prices of raw materials for colorant components be low, from the viewpoint of costs and with a view to preventing inclusion of impurities at the time of changing the base material (i.e. changing the product type) in the melting furnace to be used for the production of glass.

As colored glass plates whereby transmitted light has a green color tone, for example, the following (1) to (3) have been proposed.

(1) Green glass comprising, per 100 parts by mass of a soda lime silica glass matrix composition,
total iron calculated as $Fe_2O_3$: from 0.5 to 2.0 parts by mass,
total titanium calculated as $TiO_2$: more than 1.0 part by mass and at most 3.0 parts by mass,
CoO: from 0.003 to 0.02 part by mass,
Se: from 0 to 0.0008 part by mass,
total chromium calculated as $Cr_2O_3$: from 0 to 0.05 part by mass,
total vanadium calculated as $V_2O_5$: from 0 to 0.5 part by mass, and
total cerium calculated as $CeO_2$: from 0 to 0.5 part by mass, wherein the mass proportion of bivalent iron calculated as $Fe_2O_3$ in the total iron calculated as $Fe_2O_3$ is from 31 to 50%.

(2) UV-absorbing green glass made substantially of soda lime silica glass and comprising, as represented by mass percentage based on oxides,
total iron calculated as $Fe_2O_3$: from 0.45 to 0.491%,
total cerium calculated as $CeO_2$: from 1.09 to 1.2%,
total titanium calculated as $TiO_2$: from 0.3 to 0.39%, and
CoO: from 0 to 0.0003%,
wherein the mass proportion of bivalent iron calculated as $Fe_2O_3$ in the total iron calculated as $Fe_2O_3$ is from 30.5 to 32.0%.

(3) UV-absorbing green glass made substantially of soda lime silica glass and comprising, as represented by mass percentage based on oxides,
total iron calculated as $Fe_2O_3$: from 0.52 to 0.63%,
total cerium calculated as $CeO_2$: from 0.9 to 2%,
total titanium calculated as $TiO_2$: from 0.2 to 0.6%, and
CoO: from 0 to 0.002%,
wherein the mass proportion of bivalent iron calculated as $Fe_2O_3$ in the total iron calculated as $Fe_2O_3$ is from 31 to 38%.

However, the green glass of (1) has a problem such that since the content of CoO is large, Tv is low, and Dw is also low (i.e. transmitted light is bluish green). On the other hand, in the case of the UV-absorbing green glasses of (2) and (3), the content of CoO is small, and the content of total cerium calculated as $CeO_2$ is large, whereby Tv is high, and Tuv is sufficiently low.

However, recently, the prices for cerium raw materials have gone up, and accordingly the cost for green glass having a large content of total cerium calculated as $CeO_2$ has gone up. Therefore, a colored glass plate is desired which contains substantially no cerium and which simultaneously satisfies low solar transmittance, high visible light transmittance and low UV transmittance, while transmitted light has a green color tone.

PRIOR ART DOCUMENTS

Patent Documents

Patent Document 1: Japanese Patent No. 3,256,243
Patent Document 2: Japanese Patent No. 3,900,550
Patent Document 3: Japanese Patent No. 3,190,965

DISCLOSURE OF INVENTION

Technical Problem

The present invention is to provide a colored glass plate which, despite containing substantially no expensive cerium, simultaneously satisfies low solar transmittance, high visible light transmittance and low UV transmittance, while transmitted light has a green color tone.

Solution to Problem

The colored glass plate of the present invention is characterized by comprising, as represented by mass percentage based on oxides,
$SiO_2$: from 65 to 75%,
$Al_2O_3$: from 0 to 6%,
MgO: at least 0% and less than 2%,
CaO: from 5 to 15%,
total iron calculated as $Fe_2O_3$: from 0.3 to 1.2%,
total titanium calculated as $TiO_2$: from 0.2 to 1.1%, and
total vanadium calculated as $V_2O_5$: from 0.02 to 0.3%,
and containing substantially no cerium, cobalt, chromium or manganese.

The colored glass plate of the present invention preferably further contains, as represented by mass percentage based on oxide, from 5 to 18% of $Na_2O$.

The colored glass plate of the present invention preferably has a solar transmittance (Te) as stipulated in JIS R3106 (1998) of at most 55% as a value calculated in a thickness of 4 mm, a visible light transmittance (Tv) (illuminant A, 2 degrees field of vision) as stipulated in JIS R3106 (1998) of at least 70% as a value calculated in a thickness of 4 mm, an UV transmittance (Tuv) as stipulated in ISO-9050 of at most 12% as a value calculated in a thickness of 4 mm, and a dominant wavelength (Dw) of transmitted light as stipulated in JIS 78701 (1982) of from 540 to 570 nm.

The method for producing a colored glass plate of the present invention, comprises melting glass raw materials, followed by forming to obtain a colored glass plate comprising, as compositional components of the glass plate after the forming and as represented by mass percentage based on oxides, $SiO_2$: from 65 to 75%,
$Al_2O_3$: from 0 to 6%,
MgO: at least 0% and less than 2%,
CaO: from 5 to 15%,
total iron calculated as $Fe_2O_3$: from 0.3 to 1.2%,
total titanium calculated as $TiO_2$: from 0.2 to 1.1%, and
total vanadium calculated as $V_2O_5$: from 0.02 to 0.3%, and containing substantially no cerium, cobalt, chromium or manganese.

In the method for producing a colored glass plate of the present invention, it is preferred that the glass plate further contains, as its compositional component and as represented by mass percentage based on oxide, from 5 to 18% of $Na_2O$.

In the method for producing a colored glass plate of the present invention, it is preferred to obtain the colored glass plate which has a solar transmittance (Te) as stipulated in JIS R3106 (1998) of at most 55% as a value calculated in a thickness of 4 mm, a visible light transmittance (Tv) (illuminant A, 2 degrees field of vision) as stipulated in JIS R3106 (1998) of at least 70% as a value calculated in a thickness of 4 mm, an UV transmittance (Tuv) as stipulated in ISO-9050 of at most 12% as a value calculated in a thickness of 4 mm, and a dominant wavelength (Dw) of transmitted light as stipulated in JIS 28701 (1982) of from 540 to 570 nm.

The above expression "to" to represent a numerical range, is used to include the numerical values given before and after the expression as the lower limit value and the upper limit value, respectively, and hereinafter in this specification, the same expression "to" is used to have the same meaning, unless otherwise specified.

Advantageous Effects of Invention

The colored glass plate of the present invention, despite containing substantially no expensive cerium, simultaneously satisfies low solar transmittance, high visible light transmittance and low UV transmittance, while transmitted light has a green color tone.

BRIEF DESCRIPTION OF DRAWINGS

FIG. 1 is a graph showing the relation of Tv and Te with respect to a colored glass plate having a MgO content of at least 0% and at most 5%.

DESCRIPTION OF EMBODIMENTS

The colored glass plate of the present invention is one containing $SiO_2$ as the main component, and is preferably one made of so-called soda lime silica glass which further contains $Na_2O$, CaO, etc.

The colored glass plate of the present invention has the following composition (I). The colored glass plate of the present invention preferably has the following composition (II), more preferably has the following composition (III), further preferably has the following composition (IV).

(I) A composition comprising, as represented by mass percentage based on the following oxides,
$SiO_2$: from 65 to 75%,
$Al_2O_3$: from 0 to 6%,
MgO: at least 0% and less than 2%,
CaO: from 5 to 15%,
total iron calculated as $Fe_2O_3$: from 0.3 to 1.2%,
total titanium calculated as $TiO_2$: from 0.2 to 1.1%, and
total vanadium calculated as $V_2O_5$: from 0.02 to 0.3%, and containing substantially no cerium, cobalt, chromium or manganese.

(II) A composition comprising, as represented by mass percentage based on the following oxides,
$SiO_2$: from 65 to 75%,
$Al_2O_3$: from 0 to 6%,
MgO: at least 0% and less than 2%,
CaO: from 5 to 15%,
$Na_2O$: from 5 to 18%,
total iron calculated as $Fe_2O_3$: from 0.3 to 1.2%,
total titanium calculated as $TiO_2$: from 0.2 to 1.1%, and
total vanadium calculated as $V_2O_5$: from 0.02 to 0.3%, and containing substantially no cerium, cobalt, chromium or manganese.

(III) A composition comprising, as represented by mass percentage based on the following oxides,
$SiO_2$: from 67 to 72%,
$Al_2O_3$: from 1 to 5%,
MgO: from 0 to 1.0%,
CaO: from 6 to 10%,
$Na_2O+K_2O$: from 10 to 18%,
total iron calculated as $Fe_2O_3$: from 0.5 to 0.9%,
total titanium calculated as $TiO_2$: from 0.5 to 1.0%, and
total vanadium calculated as $V_2O_5$: from 0.05 to 0.20%, and containing substantially no cerium, cobalt, chromium or manganese.

(IV) A composition comprising, as represented by mass percentage based on the following oxides,
$SiO_2$: from 69 to 71%,
$Al_2O_3$: from 2.5 to 4%,
MgO: from 0 to 0.5%,
CaO: from 7 to 8%,
$Na_2O+K_2O$: from 11 to 16%,
total iron calculated as $Fe_2O_3$: from 0.6 to 0.8%,
total titanium calculated as $TiO_2$: from 0.7 to 0.9%, and
total vanadium calculated as $V_2O_5$: from 0.10 to 0.15%, and containing substantially no cerium, cobalt, chromium or manganese.

The colored glass plate of the present invention is characterized in that Tuv is lowered by incorporating vanadium instead of cerium, Te is lowered by incorporating iron, and Tv is made high while making Dw to be from 540 to 570 nm as desired, by adjusting the content of total iron calculated as $Fe_2O_3$, the content of total titanium calculated as $TiO_2$ and the content of total vanadium calculated as $V_2O_5$. Further, it is characterized in that by adjusting the MgO content to be at least 0% and less than 2%, as represented by mass percentage based on oxide, Te is sufficiently lowered while preventing a decrease of Tv by the addition of a colorant component.

The content of total iron calculated as $Fe_2O_3$ is from 0.3 to 1.2%, as represented by mass percentage based on oxide. When the content of total iron calculated as $Fe_2O_3$ is at least 0.3%, it is possible to lower Te. As content of total iron calculated as $Fe_2O_3$ increases, Te lowers, but Tv also lowers. When the content of total iron calculated as $Fe_2O_3$ is made to be at most 1.2%, it is possible to prevent lowering of Tv and to bring Tv to be at least 70% (as calculated in a thickness of 4 mm). The content of total iron calculated as $Fe_2O_3$ is preferably from 0.5 to 0.9%, more preferably from 0.6 to 0.8%, further preferably from 0.65 to 0.75%, as represented by mass percentage based on oxide.

The content of total titanium calculated as $TiO_2$ is from 0.2 to 1.1%, as represented by mass percentage based on oxide. When the content of $TiO_2$ is at least 0.2%, it is possible to adjust Dw to be at least 540 nm. Further, it is possible to lower Tuv. When the content of $TiO_2$ is at most 1.1%, it is possible to adjust Dw to be at most 570 nm. Further, it is possible to make Tv to be high. The content of total titanium calculated as $TiO_2$ is preferably from 0.5 to 1.0%, more preferably from 0.7 to 0.9%, as represented by mass percentage based on oxide.

The content of total vanadium calculated as $V_2O_5$ is from 0.02 to 0.3%, as represented by mass percentage based on oxide. When the content of $V_2O_5$ is at least 0.02%, it is possible to lower Tuv. When the content of $V_2O_5$ is at most 0.3%, it is possible to make Tv to be high. The content of total vanadium calculated as $V_2O_5$ is preferably from 0.05 to 0.20%, more preferably from 0.10 to 0.15%, as represented by mass percentage based on oxide.

The colored glass plate of the present invention contains substantially no cerium, cobalt, chromium or manganese which has, heretofore, been used as a typical colorant component. Here, "contains substantially no cerium, cobalt, chromium or manganese" means that cerium, cobalt, chromium or manganese is not contained at all, or cerium, cobalt, chromium or manganese may be contained as impurities unavoidably included during the production. When cerium, cobalt, chromium or manganese is not contained substantially, Tv can be made high, it is possible to prevent inclusion of impurities at the time of changing the base material, and the cost for the colored glass plate can be suppressed. The content of such impurities may vary depending upon the glass raw material to be used, but in the case of a glass plate for automobiles or buildings, it is preferably made to be less than 0.1%, more preferably less than 0.05%, further preferably less than 0.01%, as represented by mass percentage.

Here, "inclusion of impurities at the time of changing the base material" means the following.

During its production, glass may sometimes be switched to another glass type having a different glass composition (i.e. change of the base material). The inclusion of impurities at the time of changing the base material means that at the time of switching to another glass type, components of the glass before switching are included into the glass after switching. If inclusion of impurities such as cerium, cobalt, chromium, manganese, etc., takes place, after the switching, the color tone of the glass will be thereby substantially influenced.

$SiO_2$ is the main component of glass.

The content of $SiO_2$ is, as represented by mass percentage based on oxide, from 65 to 75%. When the content of $SiO_2$ is at least 65%, the weather resistance will be good. When the content of $SiO_2$ is at most 75%, devitrification is less likely to take place. The content of $SiO_2$ is, as represented by mass percentage based on oxide, preferably from 67 to 72%, more preferably from 69 to 71%.

$Al_2O_3$ is a component to improve the weather resistance.

The content of $Al_2O_3$ is, as represented by mass percentage based on oxide, from 0 to 6%. When the content of $Al_2O_3$ is at most 6%, the melting properties will be good. The content of $Al_2O_3$ is, as represented by mass percentage based on oxide, preferably from 1 to 5%, more preferably from 2.5 to 4%.

MgO is a component to accelerate melting of the glass raw material and to improve the weather resistance.

The content of MgO is, as represented by mass percentage based on oxide, at least 0% and less than 2%. When the content of MgO is less than 2%, devitrification is less likely to take place. Further, when a colored glass plate having a MgO content of less than 2% is compared with a colored glass plate having a MgO content of at least 2% at the same level of Tv, Te is lower. That is, when the content of MgO is less than 2%, it is possible to easily improve the heat ray absorption without impairing the visible light transmittance. The content of MgO is, as represented by mass percentage based on oxide, preferably from 0 to 1.0%, more preferably from 0 to 0.5%.

CaO is a component to accelerate melting of the glass raw material and to improve the weather resistance.

The content of CaO is, as represented by mass percentage based on oxide, from 5 to 15%. When the content of CaO is at least 5%, the melting properties and weather resistance will be good. When the content of CaO is at most 15%, devitrification s less likely to take place. The content of CaO is, as represented by mass percentage based on oxide, preferably from 6 to 10%, more preferably from 7 to 8%.

The colored glass plate of the present invention may contain SrO in order to accelerate melting of the glass raw material. The content of SrO is, as represented by mass percentage based on oxide, preferably from 0 to 5%, more preferably from 0 to 3%. When the content of SrO is at most 5%, the melting of the glass raw material can sufficiently be accelerated.

The colored glass plate of the present invention may contain BaO in order to accelerate melting of the glass raw material. The content of BaO is, as represented by mass percentage based on oxide, preferably from 0 to 5%, more preferably from 0 to 3%. When the content of BaO is at most 5%, the melting of the glass raw material can sufficiently be accelerated.

The colored glass plate of the present invention preferably contains $Na_2O$ and $K_2O$, or $Na_2O$, in order to accelerate melting of the glass raw material. The total content of $Na_2O$ and $K_2O$ is, as represented by mass percentage based on oxides, preferably from 10 to 18%, more preferably from 11 to 16%, further preferably from 13 to 15%. When the content of $Na_2O+K_2O$ is at least 10%, the melting properties will be good. When the content of $Na_2O+K_2O$ is at most 18%, the weather resistance will be good.

The content of $Na_2O$ is, as represented by mass percentage based on oxide, preferably from 5 to 18%, more preferably from 10 to 16%, further preferably from 12 to 15%.

The content of $K_2O$, as represented by mass percentage based on oxide, preferably from 0 to 5%, more preferably from 0.5 to 2%, further preferably from 0.8 to 1.5%.

The colored glass plate of the present invention may contain $SO_3$ used as a fining agent. The content of $SO_3$ is, as represented by mass percentage based on oxide, preferably from 0 to 1%, more preferably from 0.01 to 0.5%, further preferably from 0.05 to 0.2%. When the content of $SO_3$ is at most 1%, the gas component of $SO_2$ is less likely to remain as gas bubbles in glass.

The colored glass plate of the present invention may contain $SnO_2$ used as a fining agent. The content of $SnO_2$ is, as represented by mass percentage based on oxide, preferably from 0 to 0.5%, more preferably from 0 to 0.3%, further preferably from 0 to 0.1%. When the content of $SnO_2$ is at most 0.5%, volatilization of $SnO_2$ tends to be less, and it is possible to suppress the cost to be low.

The specific gravity of the colored glass plate of the present invention is preferably from 2.49 to 2.55, more preferably from 2.50 to 2.54. By bringing the specific gravity of the colored glass plate of the present invention to be equal to usual soda lime silica glass, it is possible to improve the efficiency for changing the composition (i.e. changing the base material) at the time of the production.

The specific gravity of the colored glass plate of the present invention can be adjusted by adjusting the glass matrix composition. To adjust the specific gravity to the above level, the mass ratio of $SiO_2/(MgO+CaO+SrO+BaO)$ is made to be preferably from 6.0 to 9.0, more preferably from 6.7 to 8.7. Here, (MgO+CaO+SrO+BaO) represents the total content of MgO, CaO, SrO and BaO which are contained.

Te (as calculated in a thickness of 4 mm) of the colored glass plate of the present invention is at most 55%, preferably at most 53%, more preferably at most 51%. Te is a solar transmittance calculated by measuring the transmittance by a spectrophotometer in accordance with JIS R3106 (1998) (hereinafter referred to simply as JIS R3106).

Tv (as calculated in a thickness of 4 mm) of the colored glass plate of the present invention is at least 70%, preferably at least 71.5%. Tv is a visible light transmittance calculated by measuring the transmittance by a spectrophotometer in accordance with JIS R3106. As the coefficient, a value of standard illuminant A, 2 degrees field of vision is employed.

Tuv (as calculated in a thickness of 4 mm) of the colored glass plate of the present invention is at most 12%, preferably at most 10%. Tuv is a UV transmittance calculated by measuring the transmittance by a spectrophotometer in accordance with ISO-9050.

The dominant wavelength (Dw) of transmitted light through the colored glass plate of the present invention is from 540 to 570 nm, preferably from 550 to 560 nm. When the dominant wavelength is within the above range, it is possible to obtain a colored glass plate whereby transmitted light has the desired green color tone. The dominant wavelength is one calculated by measuring the transmittance by a spectrophotometer in accordance with JIS Z8701 (1982). As the coefficient, a value of standard light C, 2 degrees field of vision is employed.

The colored glass plate of the present invention may be used for either vehicles or buildings and is particularly useful as a windshield or door glass for automobiles. In a case where it is to be used as a window glass for an automobile, as the case requires, it may be used in the form of laminated glass having a plurality of glass plates laminated with an interlayer, glass having flat glass processed to have a curved surface, or glass having tempering treatment applied. Otherwise, in a case where it is to be used as double-layered glass for buildings, it may be used in the form of double-layered glass composed of two colored glass plates of the present invention, or double-layered glass composed of a colored glass plate of the present invention and another glass plate.

The colored glass plate of the present invention may be produced, for example, via the following sequential steps (i) to (iv) and, as the case requires, further via a step (v).

(i) In order to attain a desired glass composition, glass matrix composition raw materials such as silica sand, etc., colorant component raw materials such as an iron source, a titanium source, a vanadium source, etc., an oxidizing agent, a reducing agent, a fining agent, etc., are suitably mixed to prepare a glass raw material.

(ii) The glass raw material is continuously supplied to a melting furnace, heated to from about 1,400 to 1,600° C. (e.g. about 1,500° C.) by heavy oil, etc. and melted to obtain molten glass.

(iii) The molten glass is refined and then formed into a glass plate having a prescribed thickness by e.g. a float process.

(iv) The glass plate is annealed and then cut into a prescribed size to obtain a colored glass plate of the present invention.

(v) As the case requires, the cut glass plate may be subjected to tempering treatment, may be processed into laminated glass, or may be processed into double-layered glass.

The glass matrix composition raw materials may be ones commonly used as raw materials for usual soda lime silica glass, such as silica sand, an alumina source, a magnesia source, a calcia source, an alkali oxide source, etc.

The iron source may, for example, be iron powder, iron oxide powder, rouge, etc.

The titanium source may, for example, be titanium oxide, etc.

The vanadium source may, for example, be vanadium oxide, etc.

The oxidizing agent may, for example, be sodium nitrate, etc. The oxidizing agent is one to accelerate oxidation of iron in molten glass.

The reducing agent may, for example, be carbon, coke, etc. The reducing agent is one to prevent oxidation of iron in molten glass.

Further, $SnO_2$ may be used as a reducing agent or a fining agent, and $SO_3$ may be used as an oxidizing agent or a fining agent.

In the colored glass plate of the present invention as described above, as represented by mass percentage based on oxide, total iron calculated as $Fe_2O_3$ is from 0.3 to 1.2%, total titanium calculated as $TiO_2$ is from 0.2 to 1.1% and total vanadium calculated as $V_2O_5$ is from 0.02 to 0.3%, whereby despite containing substantially no expensive cerium or other colorant components, it satisfies Te≤55% (as calculated in a thickness of 4 mm), Tv≥70% (as calculated in a thickness of 4 mm) and Tuv≤12% (as calculated in a thickness of 4 mm), while transmitted light has a green color tone.

Further, the MgO content is at least 0% and less than 2%, as represented by mass percentage based on oxide, whereby Te can be made to be sufficiently low while preventing a decrease of Tv by the addition of a colorant component.

From the measurements for a spectral transmittance curve with respect to glass plates different in the MgO content, conducted by the present inventors, it has been found that if the content of MgO in a glass plate is reduced, the minimum point appearing in the vicinity of a wavelength of 1,100 nm in the spectral transmittance curve tends to deviate towards the long wavelength side. Further, it has been found that the degree of such a deviation increases as the MgO content decreases.

When the minimum point in the vicinity of a wavelength of 1,100 nm deviated towards the long wavelength side, the transmittance of visible light (wavelength: from about 400 to 800 nm) became high. However, as will be described below, the relation of Tv and Te did not show a simple tendency to the MgO content.

The present inventors have plotted the relation of Tv and Te with respect to colored glass plates with a MgO content of at least 0% and at most 5%, whereby ii has been found that although ones with a MgO content being at least 0% and less than 2% and ones with a MgO content being at least 2% and at most 5%, can both be approximated by linear functions, but the respective linear functions are different. The results are shown in FIG. 1. That is, the approximate function (Te=1.79Tv−81.9) in the case of a MgO content being at least 0% and less than 2%, was located on the right hand side of the approximate function (Te=1.84Tv−82.9) in the case of a MgO content being at least 2% and at most 5%. Therefore, when compared at the same Tv, ones with a MgO content being at least 0% and less than 2% had Te lower than ones with a MgO content being at least 2% and at most 5% and thus was superior in heat ray absorption. Further, no difference was observed among ones with a MgO content being at least 2% and less than 3%, ones with a MgO content being at least 3% and less than 4%, and ones with a MgO content being at least 4% and less than 5%, and therefore, no such a simple tendency was observed that the heat ray absorption increases as the MgO content decreases.

From the foregoing, it has been found that by adjusting the MgO content to be at least 0% and less than 2%, it is possible to easily improve the heat ray absorption without impairing the visible light transmittance.

In FIG. 1, "MgO: 0-2%" is meant for "MgO: at least 0% and less than 2%", and "MgO: 2-5%" is meant for "MgO: at least 2% and at most 5%".

EXAMPLES

Now, the present invention will be described specifically with reference to Examples, but it should be understood that the present invention is by no means limited to such Examples.

Ex. 1 to 5 are Examples of the present invention, and Ex. 6 is a Comparative Example.

(Te)

With respect to an obtained glass plate, the solar transmittance (Te) as stipulated in JIS R3106 was obtained as a value calculated in a thickness of 4 mm.

(Tv)

With respect to an obtained glass plate, the visible light transmittance (Tv) (illuminant A, 2 degrees field of vision) as stipulated in JIS R3106 was obtained as a value calculated in a thickness of 4 mm.

(Tuv)

With respect to an obtained glass plate, the UV transmittance (Tuv) as stipulated in ISO-9050 was obtained as a value calculated in a thickness of 4 mm.

(Dw)

With respect to an obtained glass plate, the dominant wavelength (Dw) of transmitted light as stipulated in JIS Z8701 (1982) was obtained.

Ex. 1 to 6

The respective raw materials were mixed to attain the composition shown in Table 1, and further, in Examples 1 to 5, $Na_2SO_4$ was mixed as an oxidizing agent in the amount shown in Table 1 as calculated as $SO_3$, further in Ex. 1, $NaNO_3$ was mixed as an oxidizing agent in the amount shown in Table 1 as calculated as $NO_3$, and further, in Ex. 6, coke was mixed as a reducing agent in the amount shown in Table 1, to prepare a glass raw material. The glass raw material was put in a crucible and heated to 1,500° C. in an electric furnace to obtain molten glass. The molten glass was cast on a carbon plate and cooled. Both sides were polished to obtain a glass plate having a thickness of 4 mm. With respect to the obtained glass plate, the transmittances were measured for every 1 nm by means of a spectrophotometer (Lambda 950, manufactured by Perkin Elmer) to obtain Te, Tv, Tuv and Dw. The results are shown in Table 1.

TABLE 1

|  |  | Ex. 1 | Ex. 2 | Ex. 3 | Ex. 4 | Ex. 5 | Ex. 6 |
|---|---|---|---|---|---|---|---|
| Composition (%) | $SiO_2$ | 67.2 | 70.6 | 70.6 | 70.5 | 70.3 | 70.9 |
|  | $Al_2O_3$ | 3.1 | 3.3 | 3.3 | 3.3 | 3.3 | 1.9 |
|  | MgO | 0.3 | 0.3 | 0.3 | 0.3 | 0.3 | 0 |
|  | CaO | 8.4 | 8.8 | 8.8 | 8.8 | 8.8 | 13.1 |
|  | $Na_2O$ | 13.5 | 14.2 | 14.2 | 14.2 | 14.2 | 12.9 |
|  | $K_2O$ | 1.1 | 1.1 | 1.1 | 1.1 | 1.1 | 0.3 |
|  | $Fe_2O_3$ | 0.82 | 0.66 | 0.66 | 0.70 | 0.70 | 0.52 |
|  | $TiO_2$ | 0.58 | 0.81 | 0.81 | 0.81 | 0.80 | 0.35 |
|  | $V_2O_5$ | 0.10 | 0.11 | 0.14 | 0.14 | 0.14 | 0 |
|  | $CeO_2$ | 0 | 0 | 0 | 0 | 0 | 0 |
|  | CoO | 0 | 0 | 0 | 0 | 0 | 0 |
|  | $Cr_2O_3$ | 0 | 0 | 0 | 0 | 0 | 0 |
|  | MnO | 0 | 0 | 0 | 0 | 0 | 0 |
| Oxidizing agent (%) | $SO_3$ | 0.1 | 0.1 | 0.1 | 0.2 | 0.4 | 0 |
|  | $NO_3$ | 4.8 |  |  |  |  |  |
| Reducing agent (%) | Coke |  |  |  |  |  | 0.02 |
| Tv (%/4 mmt) |  | 71.3 | 72.6 | 72.1 | 70.4 | 72.9 | 74.3 |
| Te (%/4 mmt) |  | 45.4 | 47.6 | 47.7 | 45.0 | 49.9 | 42.6 |
| Tuv (%/4 mmt) |  | 9.3 | 12.0 | 10.4 | 9.7 | 9.1 | 29.7 |
| Dw (nm) |  | 553 | 552 | 553 | 553 | 556 | 493 |

The colored glass plate of the present invention in each of Ex. 1 to 5 satisfied Te≤55% (as calculated in a thickness of 4 mm), Tv≥70% (as calculated in a thickness of 4 mm) and Tuv≤12% (as calculated in a thickness of 4 mm), while transmitted light had a green color tone with its dominant wavelength being within a range of from 540 to 570 nm.

The colored glass plate in Ex. 6 contained no $V_2O_5$, whereby Tuv was high.

Industrial Applicability

The colored glass plate of the present invention is useful as a glass plate for vehicles and buildings, and is particularly suitable as a glass plate for automobiles.

What is claimed is:

1. A colored glass plate comprising, as represented by mass percentage based on oxides,
    $SiO_2$: from 65 to 75%,
    $Al_2O_3$: from 0 to 6%,
    MgO: from 0% to less than 2%,
    CaO: from 5 to 15%,
    total iron calculated as $Fe_2O_3$: from 0.5 to 1.2%,
    total titanium calculated as $TiO_2$: from 0.2 to 1.1%, and
    total vanadium calculated as $V_2O_5$: from 0.02 to 0.3%, and containing substantially no cerium, cobalt, chromium or manganese, wherein said colored glass plate has:
a solar transmittance as stipulated in JIS R3106 (1998) of at most 55% as a value calculated in a thickness of 4 mm,
a visible light transmittance (illuminant A, 2 degrees field of vision) as stipulated in JIS R3106 (1998) of at least 70% as a value calculated in a thickness of 4 mm,
an UV transmittance as stipulated is ISO-9050 of at most 12% as a value calculated in a thickness of 4 mm, and
a dominant wavelength of transmitted light as stipulated in JIS Z8701 (1982) of from 540 to 570 nm.

2. The colored glass plate according to claim 1, which further comprises, as represented by mass percentage based on oxide, from 5 to 18% of $Na_2O$.

3. The colored glass plate according to claim 1, which has
a solar transmittance as stipulated in JIS R3106 (1998) of at most 51% as a value calculated in a thickness of 4 mm,
a visible light transmittance (illuminant A, 2 degrees field of vision) as stipulated in JIS R3106 (1998) of at least 71.5% as a value calculated in a thickness of 4 mm,
an UV transmittance as stipulated in ISO-9050 of at most 10% as a value calculated in a thickness of 4 mm, and
a dominant wavelength of transmitted light as stipulated in JIS Z8701 (1982) of from 550 to 560 nm.

4. The colored glass plate according to claim 1, wherein the content of cerium, cobalt, chromium and manganese is less than 0.05% as represented by mass percentage.

5. The colored glass plate according to claim 1, wherein the content of cerium, cobalt, chromium and manganese is less than 0.01% as represented by mass percentage.

6. The colored glass plate according to claim 1, comprising no cerium, cobalt, chromium or manganese.

7. The colored glass plate according to claim 1, comprising, as represented by mass percentage based on oxides:
$SiO_2$: from 67 to 72%,
$Al_2O_3$: from 1 to 5%,
MgO: from 0 to 1.0%,
CaO: from 6 to 10%,
$Na_2O+K_2O$: from 10 to 18%,
total iron calculated as $Fe_2O_3$: from 0.5 to 0.9%,
total titanium calculated as $TiO_2$: from 0.5 to 1.0%, and
total vanadium calculated as $V_2O_5$: from 0.05 to 0.20%.

8. The colored glass plate according to claim 1, comprising, as represented by mass percentage based on oxides:
$SiO_2$: from 69 to 71%,
$Al_2O_3$: from 2.5 to 4%,
MgO: from 0 to 0.5%,
CaO: from 7 to 8%,
$Na_2O+K_2O$: from 11 to 16%,
total iron calculated as $Fe_2O_3$: from 0.6 to 0.8%,
total titanium calculated as $TiO_2$: from 0.7 to 0.9%, and
total vanadium calculated as $V_2O_5$: from 0.10 to 0.15%.

9. A method for producing a colored glass plate, which comprises melting glass raw materials, followed by forming to obtain a colored glass plate comprising, as compositional components of the glass plate after the forming and as represented by mass percentage based on oxides,
$SiO_2$: from 65 to 75%,
$Al_2O_3$: from 0 to 6%,
MgO: from 0% to less than 2%,
CaO: from 5 to 15%,
total iron calculated as $Fe_2O_3$: from 0.5 to 1.2%,
total titanium calculated as $TiO_2$: from 0.2 to 1.1%, and
total vanadium calculated as $V_2O_5$: from 0.02 to 0.3%,
and containing substantially no cerium, cobalt, chromium or manganese, wherein said colored glass plate has:
a solar transmittance as stipulated in JIS R3106 (1998) of at most 55% as a value calculated in a thickness of 4 mm,
a visible light transmittance (illuminant A, 2 degrees field of vision) as stipulated in JIS R3106 (1998) of at least 70% as a value calculated in a thickness of 4 mm,
an UV transmittance as stipulated is ISO-9050 of at most 12% as a value calculated in a thickness of 4 mm, and
a dominant wavelength of transmitted light as stipulated in JIS Z8701 (1982) of from 540 to 570 nm.

10. The method for producing a colored glass plate according to claim 9, wherein the glass plate further comprises, as its compositional component and as represented by mass percentage based on oxide, from 5 to 18% of $Na_2O$.

11. The method for producing a colored glass plate according to claim 9, wherein the colored glass plate has
a solar transmittance as stipulated in JIS R3106 (1998) of at most 51% as a value calculated in a thickness of 4 mm,
a visible light transmittance (illuminant A, 2 degrees field of vision) as stipulated in JIS R3106 (1998) of at least 71.5% as a value calculated in a thickness of 4 mm,
an UV transmittance as stipulated in ISO-9050 of at most 10% as a value calculated in a thickness of 4 mm, and
a dominant wavelength of transmitted light as stipulated in JIS Z8701 (1982) of from 550 to 560 nm.

12. The method according to claim 11, wherein the content of cerium, cobalt, chromium and manganese in the colored glass plate is less than 0.05% as represented by mass percentage.

13. The method according to claim 11, wherein the content of cerium, cobalt, chromium and manganese in the colored glass plate is less than 0.01% as represented by mass percentage.

14. The method according to claim 11, wherein the colored glass plate comprises no cerium, cobalt, chromium or manganese.

* * * * *